United States Patent [19]

Matsumoto et al.

[11] 4,060,143
[45] Nov. 29, 1977

[54] MUFFLER MOUNTING APPARATUS IN CONSTRUCTION MACHINERY

[75] Inventors: Takeshi Matsumoto, Hirakata; Kazukiyo Chiba, Katano; Atsuo Shioyama; Yoshitake Yamaguchi, both of Hirakata, all of Japan

[73] Assignee: Kabushiki Kaisha Komatsu Seisakusho, Tokyo, Japan

[21] Appl. No.: 655,577

[22] Filed: Feb. 5, 1976

[30] Foreign Application Priority Data

Feb. 5, 1975 Japan .................. 50-015911[U]

[51] Int. Cl.² ........................... B60K 13/04
[52] U.S. Cl. .................. 180/64 A; 181/207; 181/212
[58] Field of Search ............... 180/64 A, 64 R, 54 R, 180/54 A, 54 D, 54 E; 181/72, 360

[56] References Cited

U.S. PATENT DOCUMENTS

| | | | |
|---|---|---|---|
| 2,081,546 | 5/1937 | MacPherson | 180/64 A |
| 2,160,808 | 6/1939 | Bradley | 180/64 A |
| 2,308,969 | 1/1943 | Riesing | 180/64 A X |
| 2,446,631 | 8/1948 | Burks | 180/64 A X |
| 2,912,198 | 11/1959 | Feil, Jr. | 180/64 A X |

FOREIGN PATENT DOCUMENTS

| | | | |
|---|---|---|---|
| 750,170 | 6/1956 | United Kingdom | 180/64 A |

*Primary Examiner*—Joseph F. Peters, Jr.
*Assistant Examiner*—Milton L. Smith
*Attorney, Agent, or Firm*—Armstrong, Nikaido & Marmelstein

[57] ABSTRACT

A muffler mounting apparatus in a construction vehicle comprising a vehicle body, an engine mounted on the vehicle body, a muffler connected to an exhaust port of the engine to reduce the noise level of exhaust gas, a pair of supporting levers to support the muffler, one end of the supporting levers being pivotally connected to the vehicle body and, a pair of linkages pivotally connected between the engine and the muffler supporting levers, whereby a vibration caused by the engine can be absorbed by combined operation of the supporting levers and the linkages.

9 Claims, 10 Drawing Figures

MUFFLER MOUNTING APPARATUS IN CONSTRUCTION MACHINERY

This invention relates to an apparatus for mounting a muffler for use in the engine mounted on a construction vehicle such as a bulldozer and the like.

A conventional muffler "a" is, for example, as shown in FIG. 1, directly fixedly secured to an engine body "b" by means of bolts "c". Therefore, the vibrations of the engine body "b" and the vehicle body are directly propagated to the muffler "a" thereby rocking the latter so that the muffler "a" itself and/or muffler mounting portion are liable to be damaged. Furthermore, the dead load of the muffler "a" is carried by the engine body "b" itself, and so if the muffler is made big enough in size to reduce the noise level of exhaust gas emitted by the engine, the weight of the muffler becomes extremely heavy so that the strength of the engine body "b" becomes insufficient unless otherwise strengthened.

SUMMARY OF THE INVENTION

It is, therefore, an object of the present invention to provide a muffler mounting apparatus in a construction vehicle in which the vibration caused by both the engine and the vehicle body can be absorbed so as not to damage the muffler. It is another object of the present invention to provide a muffler mountng apparatus in a construction vehicle in which the risk of damaging the muffler can be eliminated by supporting the muffler in a flexible manner. The apparatus of the present invention comprises a vehicle body, an engine mounted on the body, a muffler connected to an exhaust part of the engine to reduce the noise level of exhaust gas, supporting levers to support the muffler, one end of each of said supporting levers being pivotally connected in the vehicle body and, linkages pivotally provided between the engine and the muffler supporting levers. Other objects, features and advantages of the present invention will be readily apparent from the following description taken in conjunction with the accompanying drawings.

DETAILED DESCRIPTION OF THE PREFERRED EMBODIMENTS

Figure 1:
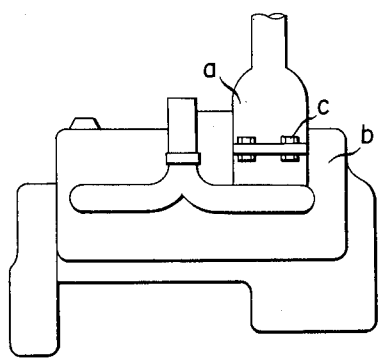
FIG. 1 is a conventional muffler mounting apparatus.
Figure 3:
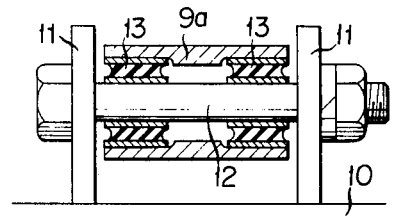
FIG. 3 is a cross-sectional view taken along the line III—III of FIG. 2.
Figure 4:
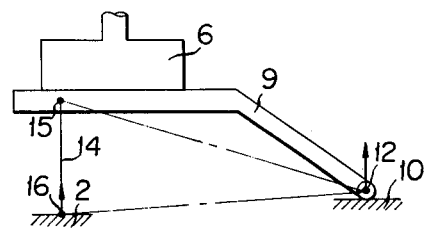
FIG. 4 to FIG. 10 are explanatory views of the operations of the present invention.
Figure 2:
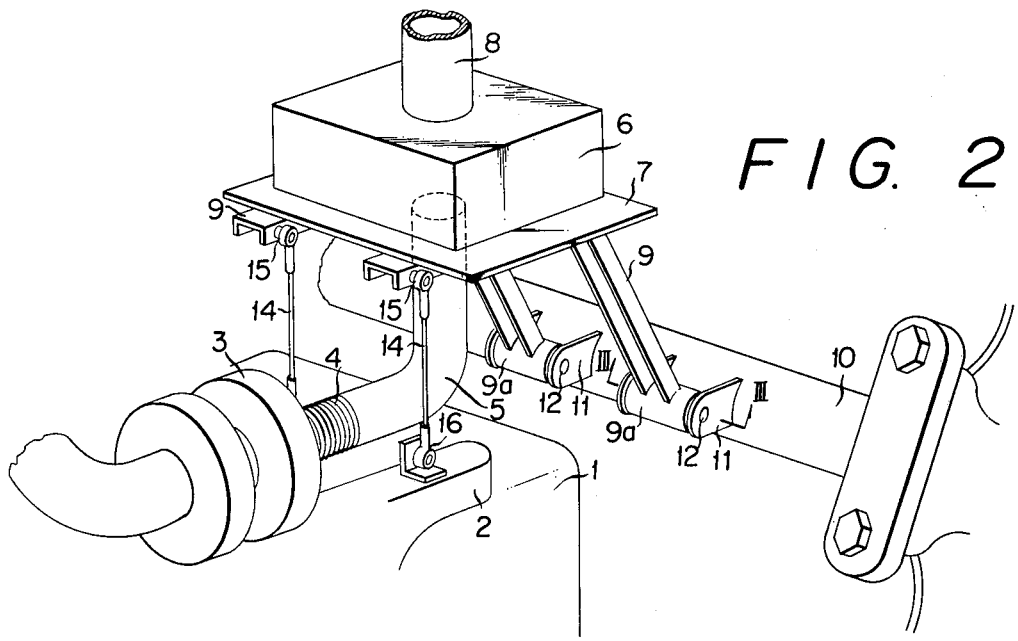
FIG. 2 is a perspective view of the present invention.

The embodiments of the present invention will now be described with reference to FIGS. 2 to 15.

Reference numeral 1 represents an engine body mounted on the front part of the vehicle body, 2 an exhaust manifold, and 3 an exhaust supercharger connected to the manifold 2. The outlet of the supercharger 3 communicates via a flexible joint 4 with an intermediate tube 5 which is connected with the muffler 6. In construction vehicles such as, for example, a bulldozer, the muffler 6 must be positioned just over the engine. The muffler 6 is fixedly secured on a base 7, and an exhaust pipe 8 is connected with the muffler 6. A pair of approximately L-shaped supporting levers 9, 9 are fixedly secured in parallel relationship to the lower face of the base 7. Each of the supporting levers 9, 9 has a boss 9a which is rotatably and resiliently mounted from outside on a support or pivotal shaft 12 through rubber bushings 13. The support shaft 12 is carried by brackets 11 secured to a cylinder stay 10. The free end of each of the supporting levers 9 is pivotally connected through a ball joint 15 to one end of each rod 14. The other end of each of the rods 14 is pivotally connected through a ball joint 16 to the exhaust manifold 2.

Briefly stated, the static load of the muffler 6 is carried by the supporting levers 9, 9 and the rods 14, and the muffler itself is fixed in position by the pivots 12, 15 and 16.

The operation of the present invention will now be described hereinbelow.

Figure 5:
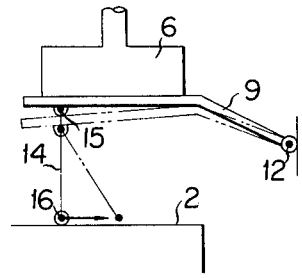

When the engine body 1 vibrates back and forth as shown in FIG. 5, the pivots 16 located on the side of the manifold are moved back and forth so that the supporting levers 9 can move up and down about each pivot 12 as a fulcrum thereof, respectively, thereof absorbing the vibration.

Figure 6:
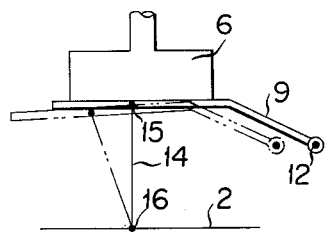

When the vehicle body vibrates back and forth as shown in FIG. 6, the cylinder stay pivots 12 are moved back and forth so that the rods 14 can oscillate about each pivot 16 as a fulcrum thereof, respectively, thereby absorbing the vibration.

Figure 8:
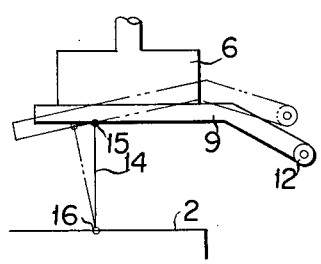
Figure 7:
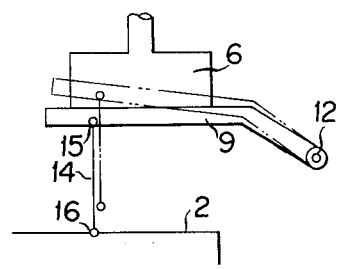

As the engine body vibrates up and down, the vibration can be absorbed in the manner as shown in FIG. 7, whereas as the vehicle body vibrates up and down, the vibration can be absorbed in the manner as shown in FIG. 8.

Figure 10:
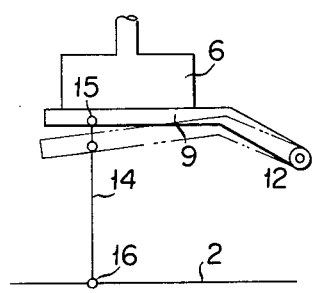
Figure 9:
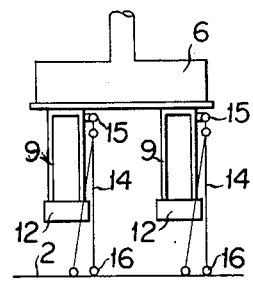
Figure 11:
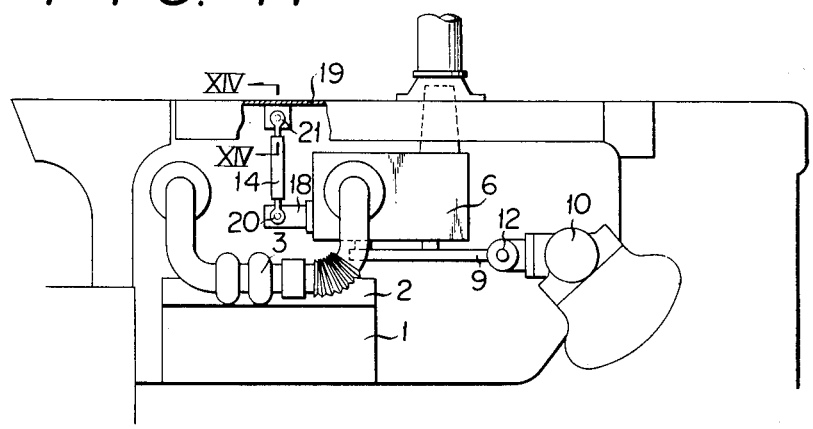
FIG. 11 is a front elevational view of another embodiment of the present invention.
Figure 13:
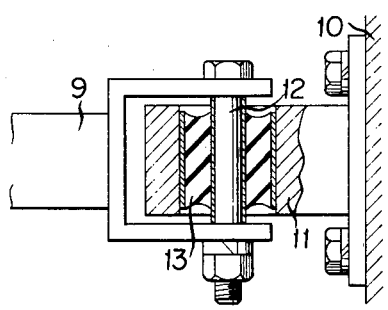
FIG. 13 is a cross-sectional view taken along the line XIII—XIII of FIG. 12.
Figure 12:
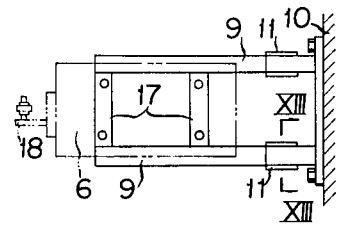
FIG. 12 is a plan view of the supporting levers employed in the present invention.

In the case the engine body and the vehicle body vibrate in horizontal direction, the arrangement of the present invention is rendered operative to absorb the vibration in the manner as shown in FIGS. 9 and 10.

FIGS. 4 to 10 illustrate the cases when strong vibration is transmitted to the arrangement of the present invention, and it is needless to say that ordinary slight vibrations or shocks can almost completely be absorbed by the rubber bushings 13.

As described hereinabove, the vibrations of the engine body and the vehicle body can be absorbed by the pivots 12, 15 and 16 so that excessive forces are not exerted on the engine body, the vehicle body and the muffler etc., and therefore there is no risk of damaging the muffler including the mounting portion thereof.

Furthermore, as clearly shown in FIGS. 11 to 14, the muffler 6 is fixedly secured on the pair of supporting levers 9, 9 connected by means of cross rods 17. A rod 14 is pivotally connected through ball joints 20 and 21 to and between a bracket 18 projecting from a side face of the muffler 6 and a bonnet 19. Further, a vibration-proofing rubber mount 22 may be located between one end of the rod 14 and the bonnet 19 so that the muffler 6 can be moved in any direction.

Figure 15:
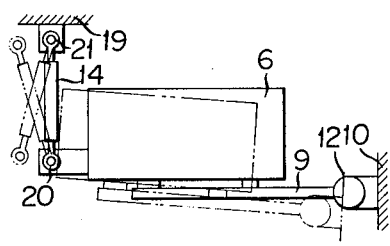
FIG. 15 is an explanatory view of the operation of the embodiment shown in FIG. 11.
Figure 14:
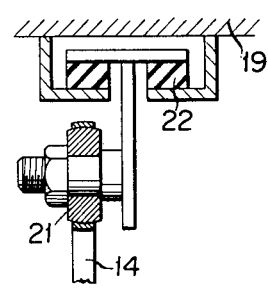
FIG. 14 is a cross-sectional view taken along the line XIV—XIV of FIG. 11.

With such an arrangement, the pivotal portions 12, 20 and 21 can vibrate in all directions to absorb the vibrations as indicated in FIG. 15 so that the risk of damaging the muffler and the associated parts thereof can be eliminated, and the dead load of the muffler 6 is not directly carried by the engine body 1 so that the durability of the engine body 1 can be much prolonged.

Since the present invention is constructed as mentioned hereinabove, the vibrations of the engine body and the vehicle body in all directions can be absorbed by the respective pivotal portions so that the vibrational forces do not directly work on the muffler 6 whereby the risk of damaging the muffler 6 including the mounting portion thereof can be eliminated.

What is claimed is:

1. A muffler mounting apparatus in construction machinery comprising a vehicle body, an engine mounted on said body, a muffler connected to an exhaust port of said engine to reduce the noise level of exhaust gas, supporting lever means connected to and supporting said muffler, one end of said supporting lever means being pivotally connected to said body, and
   linkage means pivotally connected to and extending between said engine and said muffler supporting lever means.

2. A muffler mounting apparatus in construction machinery of claim 1 wherein said supporting lever means is pivotally mounted on said body thereby permitting said muffler to rock back and forth.

3. A muffler mounting apparatus in construction machinery of claim 2 wherein, a rubber bushing is disposed at the pivot between said lever means and said body.

4. A muffler mounting apparatus in construction machinery of claim 1 wherein, both ends of said linkage means are pivoted with respect to said engine and said lever means, respectively.

5. A muffler mounting apparatus in construction machinery comprising a vehicle body, an engine mounted on said body, a muffler connected to an exhaust port of said engine to reduce the noise level of exhaust gas, supporting lever means connected to and supporting said muffler, one end of said supporting lever means being pivotally connected to said body and,
   linkage means pivotally connected to and extending between said muffler and a bonnet of said vehicle body for suspending said muffler.

6. A muffler mounting apparatus in construction machinery of claim 5 wherein a rubber bushing is disposed at a pivot between said lever means and said body.

7. A muffler mounting apparatus in construction machinery of claim 5 wherein, a rubber bushing is disposed at a pivot between said bonnet and said linkage means.

8. In a muffler mounting apparatus for use in a construction vehicle in which a muffler is positioned just over an engine mounted on a vehicle body and is connected to an exhaust port of said engine to reduce the noise level of exhaust gas, the improvement comprising a. a pair of approximately L-shaped supporting levers, one end of each lever being pivotally connected to said vehicle body positioned in the vicinity of said engine,
   b. a muffler base fixedly mounted on said supporting levers, and
   c. a pair of rods, each being pivotally connected through ball joint means between an exhaust manifold of said engine and one of the other ends of each of said supporting levers, whereby vibrations from said engine and said vehicle body are absorbed without directly acting on said muffler.

9. In a muffler mounting apparatus for use in a construction vehicle in which a muffler is positioned just over an engine mounted on a vehicle body and is connected to an exhaust port of said engine to reduce the noise level emitted by said engine, the improvement comprising a. a pair of supporting levers, one end of each supporting lever being pivotally connected to said vehicle body positioned in the vicinity of said engine,
   b. a pair of cross rods for connecting said pair of supporting levers to each other and for mounting thereon said muffler, and
   c. a pair of rods, each being pivotally connected through ball joint means between a side face of said muffler and a bonnet of said vehicle body for suspending said muffler, whereby vibrations from said engine and said vehicle body can be absorbed without directly acting on said muffler.

* * * * *